United States Patent Office 2,835,641
Patented May 20, 1958

2,835,641

AQUEOUS EMULSIONS FOR THE PREPARATION OF WATER REPELLENT DRESSINGS AND PROCESS OF TREATING FIBROUS MATERIALS THEREWITH

Gustav Widmer, Basel, Willy Fatzer, Bottmingen, Wilhelm Geigy, Binningen, Wilhelm Kraus, Basel, and Armin Hiestand, Binningen, Switzerland, assignors to Ciba Limited, Basel, Switzerland, a Swiss firm No Drawing. Application June 28, 1954
Serial No. 439,895

Claims priority, application Switzerland August 11, 1949

8 Claims. (Cl. 260—28)

This application relates to aqueous emulsions for the preparation of water repellent dressings, to a process for impregnating fibrous materials, and to the impregnated material and is a continuation-in-part of application Ser. No. 176,518, filed July 28, 1950 (now abandoned).

It has been found that aqueous emulsions of the oil-in-water type, which may be used for the production of water-repellent dressings, are very valuable if they contain in oily phase (a) a water-insoluble methylol compound of melamine in which the oxygen atom of at least one methylol group is etherified with an aliphatic alcohol containing more than 8 carbon atoms and (b) another water repellent waxy compound, and if they contain in the aqueous phase (c) an emulsifying agent consisting of a water-soluble, synthetic, high molecular substance forming highly viscous solutions, the constituents of said emulsions being present in the relative proportions by weight between the ranges: aqueous phase to oily phase 55:45 to 80:20, component (a) to component (b) 5:1 to 1:19.

The ethers of methylol melamine, which are insoluble in water and which may be used in the present invention, are produced in known manner by simultaneous condensation of melamine, formaldehyde and the higher alcohols, or by etherification of the methylol-compounds with higher alcohols, which methylol-compounds are obtainable from melamine and formaldehyde, whereby the higher alcohol which is not consumed for the etherification may serve as solvent for the condensate. Moreover, the ethers of methylol melamine may also be obtained in known manner by re-etherifying with higher alcohols methylol-compounds of melamine which are etherified with lower aliphatic alcohols, such, for example, as methyl alcohol or propyl alcohol. This re-etherification is advantageously carried out in such a way that the higher alcohol is heated, preferably under reduced pressure, in presence of a methylol-compound of melamine etherified with a lower alcohol, and the lower alcohol which has separated out is distilled off, whereby there are obtained as a rule mixed ethers of methylol melamine.

As higher alcohols containing more than 8 carbon atoms, from which alcohols the ethers of methylol melamine mentioned hereinbefore may be derived, there may for instance be mentioned: octyl alcohol, lauryl alcohol or cetyl alcohol, and advantageously those containing more than 17 carbon atoms, such as octadecyl alcohol, olein alcohol, ceryl alcohol or myricyl alcohol.

The other water repellent compound, which is used as component (b) in the emulsions of this invention, is designated in the description as "other water repellent waxy compound." This term includes natural or synthetic waxes, i. e. esters of higher monobasic acids with higher mono- or divalent alcohols, and also wax-like compound, i. e. mixture of solid hydrocarbons. These two classes of compounds may be named waxy compounds, because they have similar properties. Waxy compounds suitable for use are vegetable waxes, such as carnauba, japan, candelilla, palm and ouricuri; insect waxes, such as beeswax, petroleum waxes such as paraffin, microcrystalline and ceresin waxes, synthetic waxes, such as Acrowax, Armorwax, synthetic paraffins, and Opalwax. Blends of these waxes are also desirable. For example, carnauba wax in paraffin raises the melting point of paraffin considerably and in some cases gives results similar to pure carnauba. Advantageously there are used waxy compounds which are soluble in the methylol melamine ether (component (a)) at a raised temperature, and especially there is made use of paraffin wax.

The emulsifying agents, which are present as component (c) in the emulsions of the present invention, are water soluble, synthetic, high molecular substances forming highly viscous solutions. Such substances are, for example, polyvinyl alcohol, methyl-cellulose, salts of polymerisation products containing carboxyl groups, for example salts of copolymers of unsaturated mono- or polycarboxylic acids or anhydrides thereof with other substances capable of polymerising, for example, the ammonium salt of a copolymer of maleic anhydride and styrene or salts of cellulose ethers of oxycarboxylic acids, for example, the ammonium salt of carboxy methylcellulose. These substances giving highly viscous solutions are preferably used together with anion active emulsifying agents, for example, fatty alcohol sulfonates, condensation products of naphthalene sulfonic acids and formaldehyde, neutralized with an aqueous solution of sodium hydroxide, sodium $\mu$-heptadecyl-N-benzyl-benzimidazole disulfonate, or cation active emulsifying agents, such as 4-stearyl amino-benzene-1-trimethyl-ammonium methyl sulfate, or non-ionogenic emulsifying agents, such, for example, as an emulsifying agent, prepared by condensing a mixture of octadecyl alcohol and cetyl alcohol with ethylene oxide.

It is of advantage to use in the present invention polyvinyl alcohol having a viscosity according to Ostwald $$\frac{\text{Specific } \eta}{C} = 0.1$$

(an aqueous solution of 0.3 percent at 20° C.) and sodium $\mu$-heptadecyl-N-benzyl-benzimidazole disulfonate as an emulsifying agent. The letter "$\eta$" in the above equation represents viscosity and "C" the number of grams of dissolved substance per liter of solution: the specific viscosity is equal to the relative viscosity minus 1, where relative viscosity is the viscosity of the solution divided by the viscosity of the solvent.

For increasing their stability a weak base, for example, triethanolamine, morpholine or advantageously ammonia, may be added to the emulsions.

It has been found that it is of great importance that the components in the emulsions of the invention are present between certain ranges in order that the emulsions are stable and the water repellent dressings produced withstand washing operations. The ranges of the aqueous phase of the emulsions and their oily phase (i. e. melamine-ether and other waxy compound taken together) should lie between 55:45 and 80:20. Emulsions which contain substantially more than about 45 percent of oily phase are difficult to obtain and are not stable enough for practical purposes. As it is desirable to produce concentrated emulsions, they should not contain substantially less than 20 percent of oily phase. A preferred relationship is 66 percent aqueous phase to 34 percent oily phase, i. e. about 2:1.

Also the relationship between the two components (a) and (b) of the oily phase is important. The ranges between component (a) and component (b) should lie between 5:1 to 1:19. There are useful mixtures of 5 parts of the methylol melamine ether and 95 parts of paraffin wax, 10 parts of ether and 90 parts of wax, 25 parts of ether and 75 parts of wax, 50 parts of ether and 50 parts of wax, 75 parts of ether and 25 parts of wax, and about 83 parts of ether and 17 parts of wax. Between the two limitative ranges 5:1 and 1:19 of the components (a) and (b) the ranges may be of any value. A relationship of 1:1 however is preferred, i. e. equal parts of the two components are preferably used.

Furthermore it has been found that the quantity of emulsifying agents used is important. It is clear that in order to obtain dressings of good fastness to washing operations the quantity of emulsifying agents should be as low as possible. On the other hand stable emulsions can only be produced with a reasonable quantity of such an agent, which also depends on the quantity of oily phase which must be emulsified. The quantity of the water soluble, synthetic, high molecular substance may vary from about 0.5 to about 6 percent and preferably from 2 to 4 percent of the total weight of the emulsion, and that of the additionally used emulsifying agent from 0.0 to about 5.0 percent and preferably 1.5 to 4.0 percent.

In order to prepare the impregnating bath from the above described concentrated emulsions they may be diluted by adding 5 to 20 parts by weight of warm water and a hardening catalyst is added to the bath. Alternatively the catalyst may be previously dissolved in the water used for dilution.

As hardening catalyst potentially acid catalysts or acid catalysts may be used.

As potentially acid catalysts there may be used ammonium salts of strong acids, for example, ammonium thiocyanate, advantageously ammonium chloride, or zinc nitrate, zinc chloride or magnesium chloride, and as acid catalysts, for example, hydrochloric acid, phosphoric acid, aluminum chloride and advantageously formic acid, or mixtures of these two kinds of catalysts.

The fibrous material may be impregnated at ordinary temperature, but the impregnation is advantageously carried out at a bath temperature of 40–80° C. by the usual methods by immersion, advantageously with subsequent centrifuging or squeezing to remove an excess of impregnating agent. The process is advantageously carried out so that the increase in weight amounts to 60–100 percent calculated on the dry weight of the fibrous material.

The impregnated fibrous material is then dried by the methods usual in improving textiles, and then subjected to a heat treatment, which as a rule requires a longer duration at lower temperatures than at higher temperatures, and which is preferably carried out for about 5–15 minutes at a temperature of about 125–140° C. Preferably the impregnation is done in such a manner that the impregnated fabrics contain about 2 to 4 percent of their weight of the water repellent substances.

After this treatment it is not necessary to wash the fabric, because on the one hand, no unpleasant odours arise and, on the other, resistance to water, particularly the resistance to penetration by water and the resistance to surface wetting, that is, water repellency, is already present in high degree. The resistance to penetration is measured by the Heermann method, that is, the hydrostatic pressure test, and the water repellency by the droplet shedding test. As fibrous materials which can be impregnated there may be mentioned natural or artificial fibrous materials, more especially such of which the fibers are free from organically bound sulfur, such as yarns or fabrics, for example, or cotton, silk, cellulose esters, regenerated cellulose, polyamide fibers or paper.

The fastness properties of dyeings are not affected by this treatment. Indeed, the fastness to light of certain dyeings is even increased thereby.

The following examples illustrate the invention, the parts being by weight:

Example 1

0.2 parts of sodium-$\mu$-heptadecyl-N-benzyl-benzimidazole disulfonate, 0.3 part of a condensation product from naphthalene sulfonic acid and formaldehyde neutralized with an aqueous solution of sodium hydroxide are heated to about 70° C. while stirring, with 10 parts of an aqueous solution of about 10 percent strength of polyvinyl alcohol. 0.15 part of an aqueous ammonia solution of about 25 percent strength is then added to the solution, and 10 parts of a homogeneous melt heated at about 90° C. and consisting of 5 parts of paraffin wax and 5 parts of an ether of methylol-melamine methyl ether and technical octadecyl-alcohol, prepared as described below, are poured into the solution, and the mixture is stirred until an emulsion is formed. Then, a further 1.35 parts of the above ammonia solution and 8 parts of water having a temperature of about 70° C. are added, and then the emulsion is homogenized.

The octadecyl ether used in the above example is prepared in a manner analogous to that for preparing methylolmelamine butyl ether, according to A. Gams, G. Widmer and W. Fisch, Helvetica Chimica Acta, vol. XXIV, page 318E (1941). In this manner, 975 parts of a hexamethylol-melamine which is practically wholly etherified with methyl alcohol are melted with 675 parts of commercial octadecyl alcohol at about 60° C., adding to the mixture 12.5 parts of a concentrated aqueous solution of hydrochloric acid, whereupon the re-etherification is brought about under reduced pressure at about 90° C. By the addition of an aqueous solution of sodium hydroxide the hydrochloric acid is neutralized. The octadecyl ether so obtained is wax-like and forms homogeneous mixtures with paraffin wax in all proportions.

Example 2

The emulsion produced according to Example 1 may for instance be used in the following manner for water-repelling dressings resistant to washing for fibrous materials:

Cotton gabardine is treated on the foulard until the increase in weight amounts to about 100 percent (calculated on the dry weight of the fabric) with a bath having a temperature of about 65° C., which contains 9 parts of water, 0.1 part of ammonium chloride, 0.05 part of concentrated formic acid and 1 part of an emulsion obtained as described in Example 1.

The fabric is then dried, for example, by heating for ½ hour at about 90° C., and hardening is then brought about by heating for 15 minutes at 125–140° C.

The fabric thus treated shows a very good droplet shedding effect, also if the same is boiled for 30 minutes in a wash-liquor containing per liter 5 grams soap and 2 grams sodium carbonate, whereupon the fabric is rinsed and dried. The resistance to water as measured by the Heermann method is hardly affected by washing.

Instead of cotton gabardine there may be used, for example, a fabric of regenerated cellulose, a fabric of a cellulose ester, a fabric of polyamide fibers or paper.

Example 3

An emulsion is prepared as described in Example 1, but there are used only 2.0 parts of the aqueous solution of polyvinyl alcohol, or 2.0 parts of a solution of the copolymer from styrene and maleic anhydride or 2.0 percent of the solution of the carboxy-methyl cellulose respectively. (The difference to 10 parts was made up with 8 parts of water.) There may also be used for the preparation of the emulsion 5 or 10 parts of the solutions of the above named emulsifying agents.

Example 4

Example 1 was repeated but there were used 5 parts of an ether from methylated methylol melamine and lauryl alcohol prepared in the same manner as the ether described in Example 1.

Example 5

Example 1 was repeated, but the paraffin wax was replaced by the same quantity of beeswax or a mixture of equal parts of beeswax and paraffin wax.

Example 6

Example 1 was repeated, but the mixture of 5 parts of the ether from methylated methylol melamine and stearyl alcohol and 5 parts of paraffin wax was replaced by 10 parts of the following mixtures:

(a) 95 percent paraffin wax, 5 percent ether (ratio 19:1)
(b) 83.4 percent paraffin wax, 16.6 percent ether (ratio 5:1)
(c) 75 percent paraffin wax, 25 percent ether (ratio 3:1)
(d) 25 percent paraffin wax, 75 percent ether (ratio 1:3)
(e) 16.6 percent paraffin wax, 83.4 percent ether (ratio 1:5)

What is claimed is:

1. A concentrated aqueous emulsion of the oil-in-water type suitable for the preparation of an aqueous impregnating bath, which emulsion contains in the oily phase (a) a water-insoluble methylol compound of melamine in which the oxygen atom of at least one methylol group is etherified with an aliphatic saturated alcohol containing more than 8 carbon atoms and (b) a water repellent wax selected from the group consisting of paraffin wax and beeswax, said emulsion containing in the aqueous phase (c) an emulsifying agent consisting of a water soluble, synthetic, high molecular substance forming highly viscous solutions, the constituents of said emulsion being present in the relative proportions by weight between the ranges: aqueous phase to oily phase 55:45 to 80:20, component (a) to component (b) 5:1 to 1:19 and component (c) 0.5 to 6 percent of the total weight of the emulsion.

2. A concentrated aqueous emulsion of the oil-in-water type suitable for the preparation of an aqueous impregnating bath, which emulsion contains in the oily phase (a) a water-insoluble methylol compound of melamine in which the oxygen atom of at least one methylol group is etherified with an aliphatic saturated alcohol containing more than 17 carbon atoms and (b) paraffin wax, said emulsion containing in the aqueous phase (c) an emulsifying agent consisting of a water soluble, synthetic, high molecular substance forming highly viscous solutions, the constituents of said emulsion being present in the relative proportions by weight between the ranges: aqueous phase to oily phase 55:45 to 80:20, component (a) to component (b) 5:1 to 1:19 and component (c) 0.5 to 6 percent of the total weight of the emulsion.

3. A concentrated aqueous emulsion of the oil-in-water type suitable for the preparation of an aqueous impregnating bath, which emulsion contains in the oily phase (a) a water-insoluble methylated methylol melamine in which the oxygen atom of at least one methylol group is etherified with stearyl alcohol and (b) paraffin wax, said emulsion containing in the aqueous phase as an emulsifying agent (c) polyvinyl alcohol, the constituents of said emulsion being present in the relative proportions by weight between the ranges: aqueous phase to oily phase 55:45 to 80:20, component (a) to component (b) 5:1 to 1:19 and component (c) 0.5 to 6 percent of the total weight of the emulsion.

4. A concentrated aqueous emulsion of the oil-in-water type suitable for the preparation of an aqueous impregnating bath, which emulsion contains in the oily phase (a) a water-insoluble methylated methylol melamine in which the oxygen atom of at least one methylol group is etherified with stearyl alcohol and (b) paraffin wax, said emulsion containing in the aqueous phase as emulsifying agents (c) polyvinyl alcohol, (d) sodium $\mu$-heptadecyl-N-benzyl-benzimidazole disulfonate and (e) a condensation product from naphthalene sulfonic acid and formaldehyde neutralized with sodium hydroxide, the constituents of said emulsion being present in the relative proportions expressed in parts by weight: aqueous phase to oily phase 66:34, component (a) to component (b) 17:17, component (c) 3.4 percent and the sum of components (d) and (e) 1.7 percent of the total weight of the emulsion.

5. Process for producing on fibrous materials a water-repellent dressing resistant to washing, wherein the fibrous material is treated in an aqueous bath obtained by diluting with water an emulsion claimed in claim 1 and adding a hardening catalyst, and in which process the treated material is dried and subjected to a heat treatment.

6. Process for producing on fibrous materials a water-repellent dressing resistant to washing, wherein the fibrous material is treated in an aqueous bath obtained by diluting with water an emulsion claimed in claim 2 and adding a hardening catalyst, and in which process the treated material is dried and subjected to a heat treatment.

7. Process for producing on fibrous materials a water-repellent dressing resistant to washing, wherein the fibrous material is treated in an aqueous bath obtained by diluting with water an emulsion claimed in claim 3 and adding a hardening catalyst, and in which process the treated material is dried and subjected to a heat treatment.

8. Process for producing on fibrous materials a water-repellent dressing resistant to washing, wherein the fibrous material is treated in an aqueous bath obtained by diluting with water an emulsion claimed in claim 4 and adding a hardening catalyst, and in which process the treated material is dried and subjected to a heat treatment.

References Cited in the file of this patent

UNITED STATES PATENTS

| | | |
|---|---|---|
| 2,344,926 | Thackston et al. | Mar. 21, 1944 |
| 2,426,770 | Grim | Sept. 7, 1947 |
| 2,586,098 | Schibler | Feb. 19, 1952 |